(12) United States Patent
Kobayashi et al.

(10) Patent No.: US 9,027,697 B2
(45) Date of Patent: May 12, 2015

(54) CONSTRUCTION MACHINE

(75) Inventors: Takahiro Kobayashi, Tsuchiura (JP);
Tsuyoshi Nakamura, Tsuchiura (JP);
Kensuke Sato, Ushiku (JP); Hiroyuki Azuma, Ushiku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/110,161

(22) PCT Filed: May 14, 2012

(86) PCT No.: PCT/JP2012/062296
§ 371 (c)(1),
(2), (4) Date: Oct. 7, 2013

(87) PCT Pub. No.: WO2012/172903
PCT Pub. Date: Dec. 20, 2012

(65) Prior Publication Data
US 2014/0023473 A1 Jan. 23, 2014

(30) Foreign Application Priority Data

Jun. 14, 2011 (JP) ................................. 2011-132347

(51) Int. Cl.
*B60K 13/04* (2006.01)
*E02F 9/08* (2006.01)
*E02F 3/30* (2006.01)

(52) U.S. Cl.
CPC ............ *E02F 9/0858* (2013.01); *E02F 9/0875* (2013.01); *E02F 9/0883* (2013.01); *E02F 3/30* (2013.01); *E02F 9/0833* (2013.01); *E02F 9/0866* (2013.01); *E02F 9/0891* (2013.01); *F01N 2590/08* (2013.01); *F01N 2610/1406* (2013.01); *B60K 13/04* (2013.01); *B60Y 2200/412* (2013.01)

(58) Field of Classification Search
USPC ........... 180/309, 89.2, 311, 296; 60/295, 297; 248/637, 678, 676, 677, 671
See application file for complete search history.

(56) References Cited

U.S. PATENT DOCUMENTS 5,832,726 A * 11/1998 Rees et al. ...................... 60/322
7,967,094 B2 * 6/2011 Matsushita et al. ........ 180/89.17
8,186,156 B2 * 5/2012 Kamiya et al. .................. 60/420
8,365,518 B2 * 2/2013 Ezawa et al. .................... 60/297
8,403,099 B2 * 3/2013 Yokota .......................... 180/309
8,418,448 B2 * 4/2013 Kamata et al. .................. 60/322

(Continued)

FOREIGN PATENT DOCUMENTS

JP 2000-212998 A 8/2000
JP 2001-279714 A 10/2001

(Continued)

*Primary Examiner* — Jeffrey J Restifo
*Assistant Examiner* — James M Dolak
(74) *Attorney, Agent, or Firm* — Mattingly & Malur, PC

(57) ABSTRACT

On the right front side of a revolving frame (5) constituting an upper revolving structure (3), an operating oil tank (11) and a fuel tank (12) are arranged. On the front side of this operating oil tank (11) and the fuel tank (12), an equipment accommodating case (13) forming an accommodating space (13A) inside is provided. In the accommodating space (13A) in the equipment accommodating case (13), a control valve unit (20) for controlling supply/discharge of the operating oil and a urea water tank (24) storing urea water for removing nitrogen oxides contained in an exhaust gas of the engine (8) are arranged together.

2 Claims, 15 Drawing Sheets

(56) References Cited

U.S. PATENT DOCUMENTS

| | | | |
|---|---|---|---|
| 8,459,014 B2 * | 6/2013 | Kamiya et al. | 60/295 |
| 8,516,807 B2 * | 8/2013 | Kosaka et al. | 60/297 |
| 8,549,847 B2 * | 10/2013 | Kamiya et al. | 60/299 |
| 8,573,646 B2 * | 11/2013 | Kamiya | 180/89.2 |
| 8,820,691 B2 * | 9/2014 | Bednarz et al. | 248/295.11 |
| 8,851,224 B2 * | 10/2014 | Hayashi et al. | 180/309 |
| 2010/0186394 A1 * | 7/2010 | Harrison et al. | 60/299 |

FOREIGN PATENT DOCUMENTS

| | | |
|---|---|---|
| JP | 2002-097665 A | 4/2002 |
| JP | 2003-020936 A | 1/2003 |
| JP | 2008-240676 A | 10/2008 |
| JP | 2009-144365 A | 7/2009 |
| JP | 2010-285814 A | 12/2010 |
| JP | 2011-058247 A | 3/2011 |
| WO | 2011/033732 A1 | 3/2011 |

* cited by examiner

CONSTRUCTION MACHINE

TECHNICAL FIELD

The present invention relates to a construction machine such as a hydraulic excavator, a hydraulic crane and the like and particularly to a construction machine on which a urea selective reduction catalyst and a urea water tank for removing nitrogen oxides contained in an exhaust gas are mounted.

BACKGROUND ART

In general, a hydraulic excavator which is a typical example of a construction machine is composed of an automotive lower traveling structure, an upper revolving structure rotatably mounted on the lower traveling structure, and a working mechanism capable of moving upward/downward on the front side of the upper revolving structure.

The upper revolving structure is composed of a revolving frame forming a support structural member, an engine mounted on the rear side of the revolving frame, and a cab provided on the left front side of the revolving frame so as to follow the left side of the working mechanism. In the cab, an operator's seat on which an operator is seated and the like are provided.

On the revolving frame, a fuel tank located on the right side of the working mechanism and storing fuel to be supplied to the engine is provided. On the front side of the fuel tank, a toolbox accommodating articles such as a tool, a grease gun, various consumables and the like is provided.

On the other hand, a diesel engine is used for an engine of a hydraulic excavator. This diesel engine is said to emit a large quantity of nitrogen oxides (hereinafter referred to as NOx) and the like. Thus, as a post-treatment device of an exhaust gas of a diesel engine, a NOx purifying device for purifying NOx is known. This NOx purifying device is composed of a urea selective reduction catalyst provided in an exhaust pipe of an engine, for example, for removing nitrogen oxides in the exhaust gas, a urea water tank storing a urea aqueous solution (urea water) as a reducing agent, a urea water injection valve arranged on the upstream side of the urea selective reduction catalyst in a flow direction of the exhaust gas and injecting urea water to the exhaust gas, and a connection pipeline connecting the urea water tank and the urea water injection valve.

Here, when a urea water tank is to be provided on a hydraulic excavator, a tank volume is preferably set larger in order to reduce the number of times of solution supply. However, since a large number of devices are mounted on the hydraulic excavator, it is difficult to ensure a new space on which a urea water tank is to be installed. Thus, a hydraulic excavator according to a conventional art is configured such that a urea water tank is accommodated in a toolbox for accommodating tools and the like (Patent Document 1).

PRIOR ART DOCUMENT

Patent Document

Patent Document 1: Japanese Patent Laid-Open No. 2008-240676 A

SUMMARY OF THE INVENTION

Since the conventional art according to the above described Patent Document 1 is configured such that the urea water tank is accommodated in a toolbox, incase the tank volume is increased, the volume of the original toolbox is reduced, and there is a problem that a space for accommodating the tools, consumables and the like is made smaller.

If a urea water tank is accommodated in a toolbox, it is concerned that an access to the urea water tank might be obstructed by tools and the like in the toolbox, and labor might be required for a supply work to the urea water tank, which is a problem.

On the other hand, hydraulic excavators including a model with a smaller rear-end radius (rear small-revolving type hydraulic excavator) in order to ensure a lane where a vehicle travels for a road construction and the like or in order to reduce a concern of contact between the rear end and a human being and the like during revolving are known. Since this rear small-revolving type hydraulic excavator has its upper revolving structure made as compact as possible in order to reduce the revolving radius, the space in the toolbox might be small or the toolbox itself is not present, and it is difficult to realize accommodation of the urea water tank in the toolbox.

In view of the above-discussed problems with the conventional art, it is an object of the present invention to provide a construction machine in which a urea water tank can be mounted by effectively using a small space on the upper revolving structure.

(1) A construction machine according to the present invention comprising: a lower traveling structure; an upper revolving structure rotatably mounted on the lower traveling structure; and a working mechanism tiltably provided on the front part of the upper revolving structure; the upper revolving structure being provided with a revolving frame forming a support structural body, an engine mounted on the rear side of the revolving frame and driving a hydraulic pump, an oil tank arranged on the front side of the engine and on one side in a left-right direction of the revolving frame and storing fuel to be supplied to the engine or operating oil to be supplied to a hydraulic actuator, an equipment accommodating case located on the front of the oil tank and provided on the revolving frame so as to form an accommodating space inside, a control valve unit composed of a collection of a large number of control valves and the like in order to control supply/discharge of the operating oil between the hydraulic pump and the hydraulic actuator, a NOx purifying device provided in the middle of an exhaust pipe of the engine and provided with a urea selective reduction catalyst removing nitrogen oxides contained in the exhaust gas, a urea water injection valve located on the upstream side of the urea selective reduction catalyst in a flow direction of the exhaust gas and injecting urea water which is a reducing agent to the exhaust gas flowing through the exhaust pipe, and a urea water tank connected to the urea water injection valve and formed of a hollow container for storing the urea water.

In order to solve the above problem, the configuration adopted by the present invention is characterized in that the equipment accommodating case is composed of a front surface of the oil tank, an inner side plate extending forward from the oil tank in order to form an inner side surface in the left-right direction of the accommodating space, an outer side plate extending forward from the oil tank in order to form an outer side surface in the left-right direction of the accommodating space, and an upper closing plate located between the oil tank and a front end of the revolving frame and covering the upper sides of the inner side plate and the outer side plate; and in the accommodating space in the equipment accommodating case, the control valve unit and the urea water tank are arranged together.

With this arrangement, the accommodating space can be formed in the equipment accommodating case by composing the equipment accommodating case by the front surface of the oil tank, the inner side plate, the outer side plate, and the upper closing plate. Therefore, in the accommodating space in the equipment accommodating case, the control valve unit and the urea water tank can be arranged together. As a result, a small space on the upper revolving structure can be effectively used for arranging the urea water tank, and the urea water tank can be also mounted on a small-sized construction machine.

(3) According to the present invention, in the equipment accommodating case, a bracket having a leg portion installed upright on the revolving frame and a support plate provided on the upper end side of the leg portion is provided, the control valve unit is mounted on the support plate of the bracket, and the urea water tank is arranged between the support plate of the bracket and the revolving frame.

With this arrangement, the urea water tank can be arranged using a space formed between the support plate of the bracket on which the control valve unit is to be mounted and the revolving frame. Therefore, the urea water tank can be arranged efficiently by using a space in the vertical direction in the equipment accommodating case.

(4) According to the present invention, in the accommodating space in the equipment accommodating case, a tank support member is provided by being located on the upper side from the control valve unit, and the urea water tank is arranged on the tank support member by being located on the back surface side of the upper closing plate.

With this arrangement, since it is configured that the urea water tank is arranged on the upper side of the control valve unit through the tank support member, the urea water tank can be arranged in the space on the back surface side of the upper closing plate covering the accommodating space. As a result, the control valve unit and the urea water tank can be arranged side by side in the vertical direction, and the urea water tank can be arranged efficiently.

(5) According to the present invention, the working mechanism and the revolving frame are detachably connected by using a connecting pin, a connecting pin moving hole for allowing movement of the connecting pin in the left-right direction for detaching/attaching the working mechanism and the revolving frame is provided in the inner side plate, and the urea water tank is arranged detachably within a range of a pin moving trajectory indicating a moving direction of the connecting pin.

With this arrangement, since the urea water tank is arranged within the range of the pin moving trajectory indicating the moving direction of the connecting pin, the control valve unit can be arranged while avoiding the pin moving trajectory and can be arranged at a position which does not obstruct a work of inserting/taking out the connecting pin. In this case, the urea water tank can be arranged by effectively using a space that could not be used for inserting/taking out the connecting pin.

(6) According to the present invention, on a front surface of the oil tank, a notched portion forming a part of the accommodating space is provided by denting a part of the front surface of the oil tank rearward, and the urea water tank is arranged in the notched portion of the oil tank.

With this arrangement, by providing the notched portion on the front surface of the oil tank which is a rear wall of the equipment accommodating case, the accommodating space in the equipment accommodating case can be enlarged. Therefore, by using the space enlarged by the notched portion, a maintenance work and the like of the control valve unit and the urea water tank arranged in the accommodating space can be performed efficiently.

(7) According to the present invention, the outer side plate is formed as an opening/closing cover rotationally moved between an open position for opening the accommodating space and a closed position for closing the same, and the urea water tank is arranged on an inner surface of the opening/closing cover.

With this arrangement, since the outer side plate covering the accommodating space is formed as the opening/closing cover, by opening the opening/closing cover, the urea water tank arranged on the inner surface thereof can be moved to the outside, and a water supply work to the urea water tank can be performed easily. Moreover, in a state where the opening/closing cover is set at the open state and the urea water tank is moved to the outside of the accommodating space, a large work space can be ensured in the accommodating space, and the maintenance work and the like for the control valve unit can be performed easily.

BRIEF DESCRIPTION OF THE DRAWINGS

FIG. 5 is a configuration diagram illustrating a configuration of an exhaust gas post-treatment device along with an engine and the like.

MODE FOR CARRYING OUT THE INVENTION

As an example of a construction machine according to embodiments of the present invention, a crawler-type hydraulic excavator will be described below in detail referring to the attached drawings.

FIGS. 1 to 5 illustrate a first embodiment of the present invention. In this first embodiment, a case in which a urea water tank is arranged between a support plate of a bracket on which the control valve unit is mounted and a revolving frame in an equipment accommodating case is exemplified.

Figure 1:
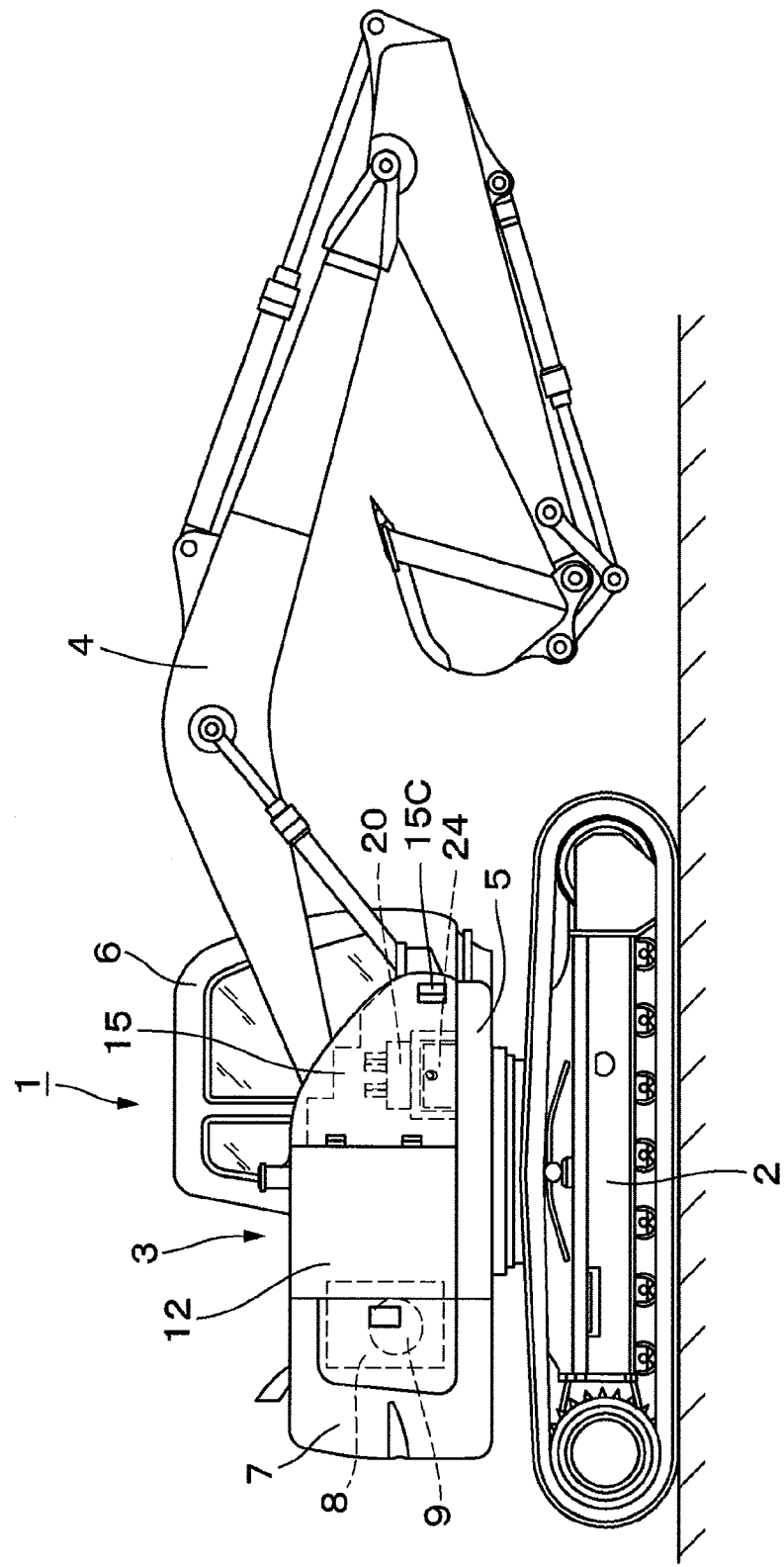
FIG. 1 is a front view illustrating a hydraulic excavator applied to a first embodiment of the present invention.
Figure 2:
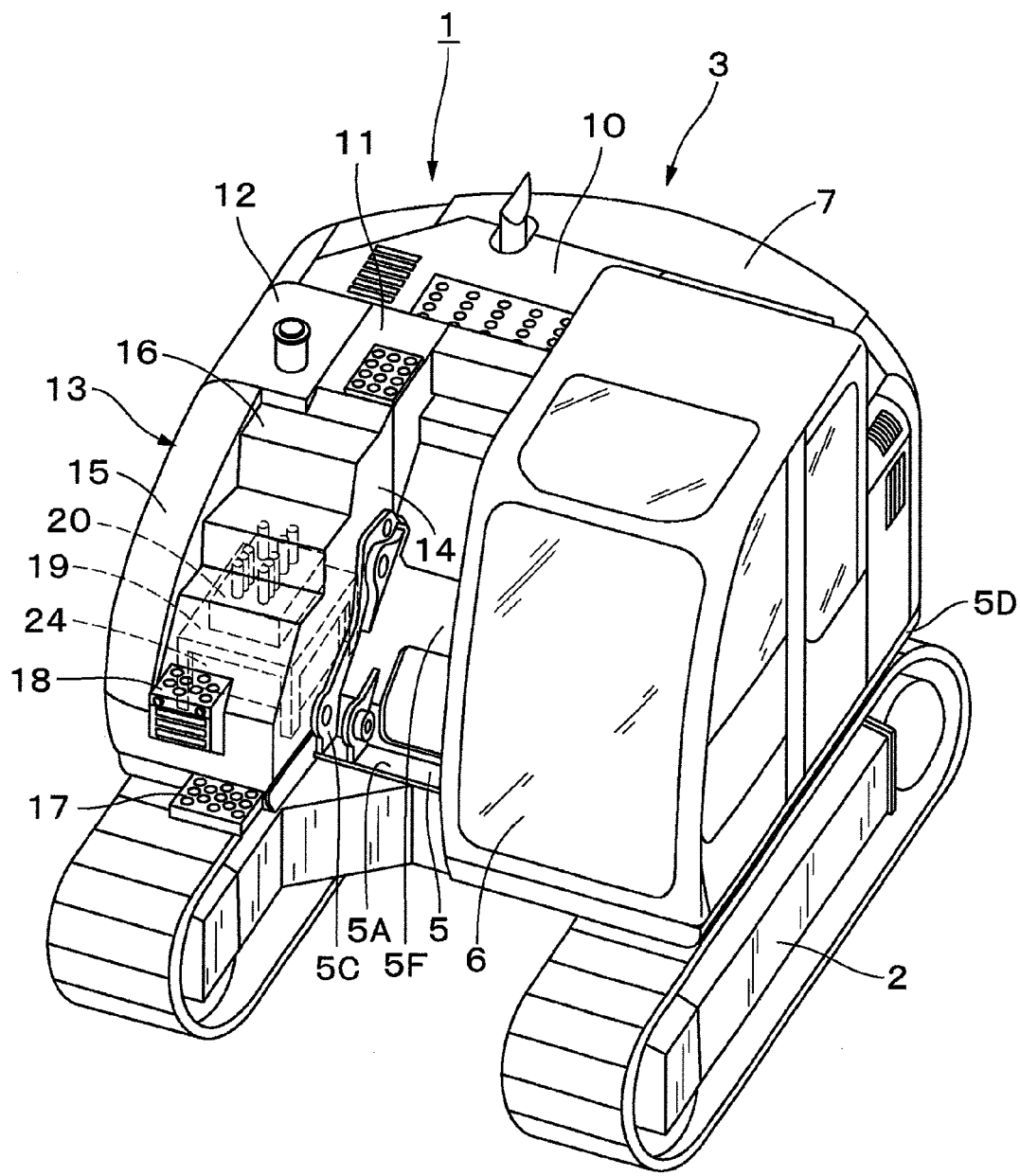
FIG. 2 is a perspective view illustrating the hydraulic excavator applied to the first embodiment.

In FIG. 1, designated at 1 is a hydraulic excavator as a construction machine used for an excavating work of earth and sand and the like. This hydraulic excavator 1 is largely constituted by an automotive crawler-type lower traveling structure 2, an upper revolving structure 3 rotatably mounted on the lower traveling structure 2, and a working mechanism 4 tiltably provided on the front side of the upper revolving structure 3.

The upper revolving structure 3 is composed of a revolving frame 5, a cab 6, a counterweight 7, an engine 8, an operating oil tank 11, a fuel tank 12, an equipment accommodating case 13, an exhaust gas post-treatment device 21, a urea water tank 24 and the like, which will be described later.

The revolving frame 5 constitutes a support structural body of the upper revolving structure 3, and this revolving frame is composed of a thick bottom plate 5A extending in the front-rear direction, a left vertical plate 5B and a right vertical plate 5C installed upright on the bottom plate 5A and extending in the front-rear direction at a predetermined interval in the left-right direction, a plurality of extension beams (not shown) extending from the each of the vertical plates 5B and 5C outward in the left-right direction and arranged at intervals in the front-rear direction, a left side frame 5D and a right side frame 5E located outside in the left-right direction, mounted at a distal end of each of the extension beams, and extending in the front-rear direction, and a front lateral plate 5F provided on the front side of each of the vertical plates 5B and 5C.

The cab 6 is mounted on the left front side of the revolving frame 5. This cab 6 is for an operator to get on and has an operator's seat on which an operator is seated, various operation levers, air conditioning devices and the like (none of them is shown) disposed therein.

The counterweight 7 is mounted on a rear end portion of the revolving frame 5, and the counterweight 7 holds weight balance with the working mechanism 4. Here, the hydraulic excavator 1 is formed as a rear small-revolving type hydraulic excavator having a small revolving radius on a rear surface of the counterweight 7. Thus, the counterweight 7 is arranged at a position close to the revolving center of the upper revolving structure 3 and moreover, a rear surface of the counterweight 7 is formed on an arc around the revolving center of the upper revolving structure 3 when seen from above.

The engine 8 is to drive a hydraulic pump 9 which will be described later (See FIG. 1), and a diesel engine is employed for the engine 8. The engine 8 is located on the front side of the counterweight 7 and is mounted laterally extending in the left-right direction on the revolving frame 5. The hydraulic pump 9 is mounted on the right side of the engine 8 and supplies operating oil as pressure oil in the operating oil tank 11 by being driven by the engine 8.

Figure 5:
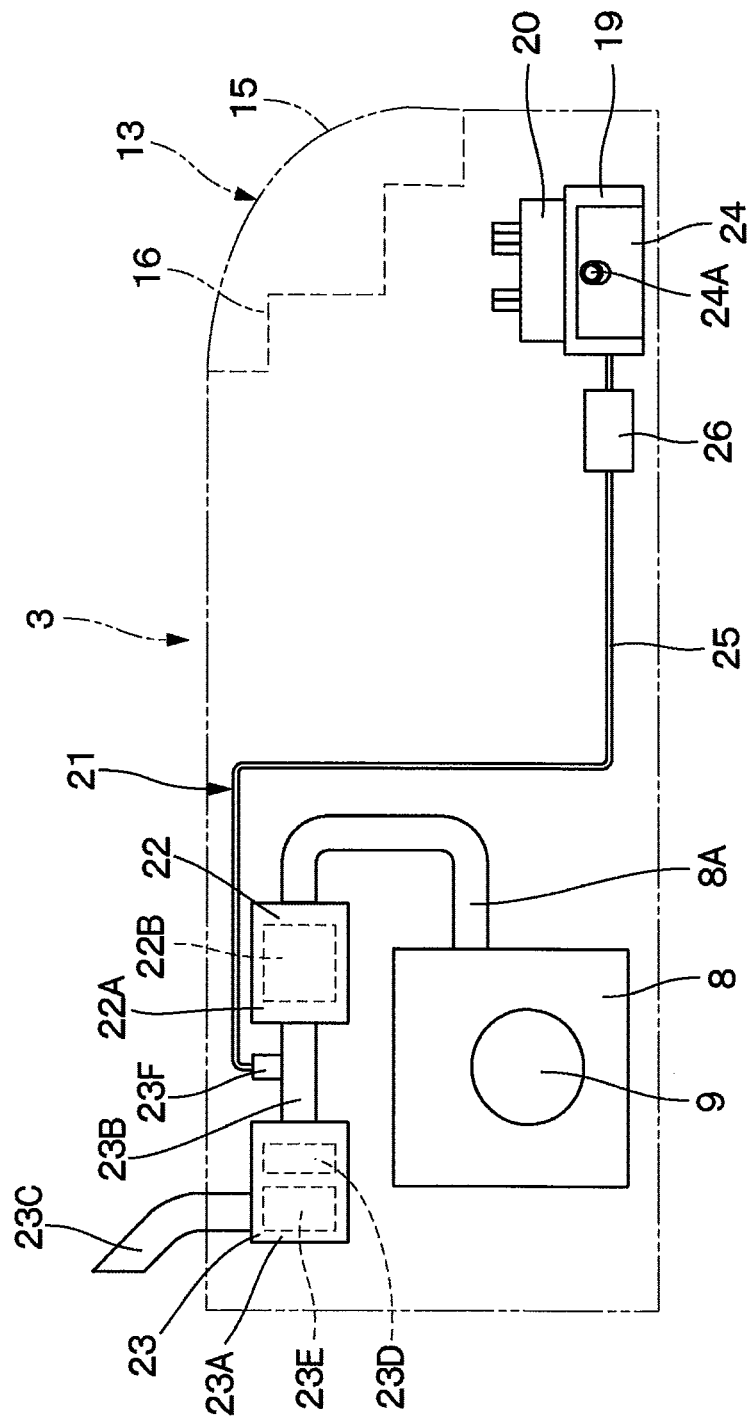

Here, since a diesel engine is employed for the engine 8, it has high efficiency and excellent durability, but hazardous substances such as nitrogen oxides (NOx) and the like are discharged with the exhaust gas. Thus, as illustrated in FIG. 5, the exhaust gas post-treatment device 21 which will be described later is mounted on an exhaust pipe 8A of the engine 8, and the exhaust gas post-treatment device 21 is provided with a NOx purifying device 23 for removing nitrogen oxides (NOx). The engine 8 is covered by an engine cover 10 (See FIG. 2).

Figure 4:
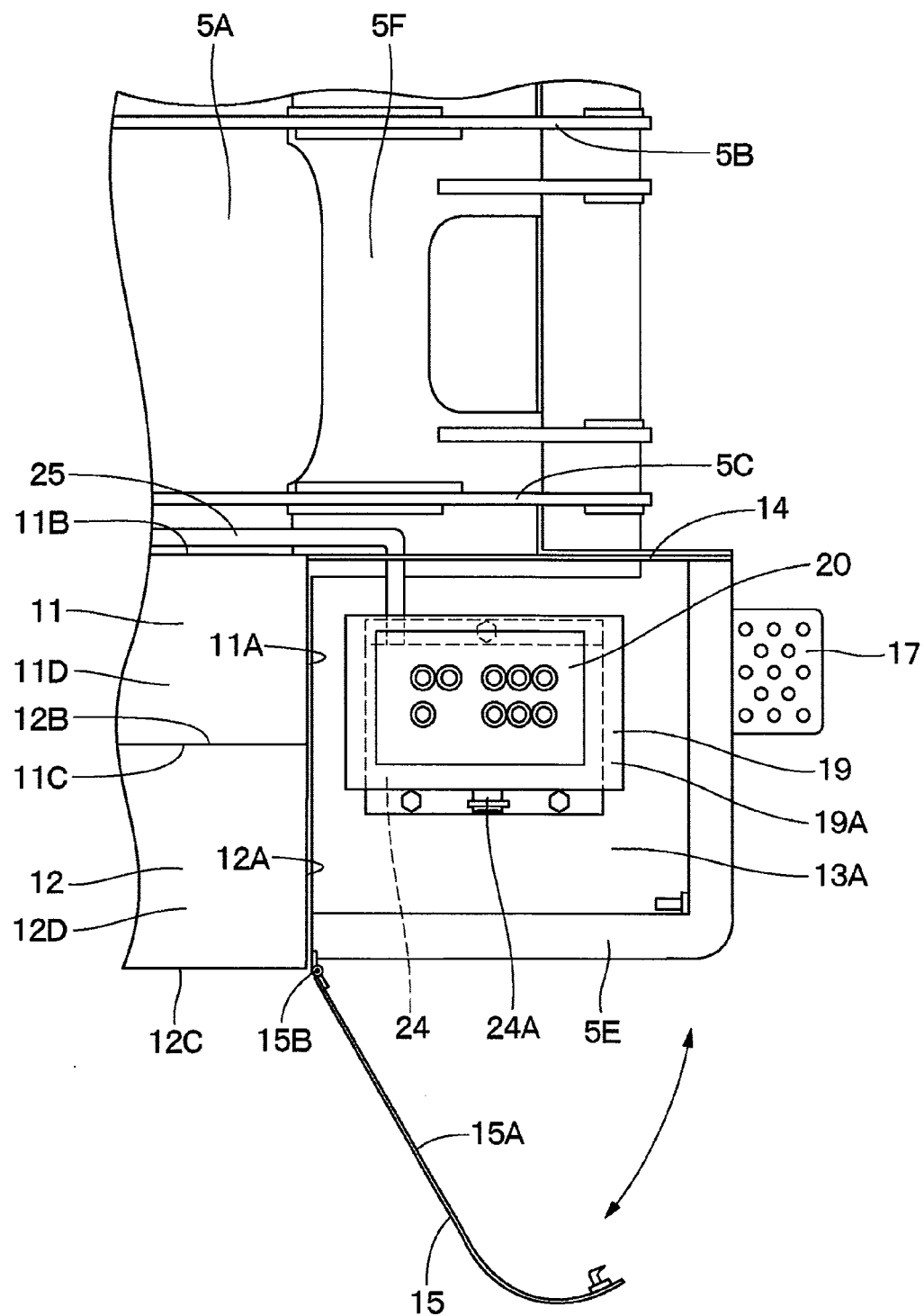
FIG. 4 is an enlarged plan view of an essential part illustrating the accommodating space, the control valve unit, the urea water tank and the like according to the first embodiment in a state where an upper closing plate is removed.

Designated at 11 is the operating oil tank as an oil tank located on the front side of the engine 8 and provided on the right side of the revolving frame 5. As illustrated in FIG. 4, the operating oil tank 11 is formed as a cuboid tank surrounded by a front surface 11A, a rear surface (not shown), a left side surface 11B, a right side surface 11C, a top surface 11D, and a lower surface (not shown). The front surface 11A constituting the operating oil tank 11 is configured as a rear wall of the equipment accommodating case 13 which will be described later.

Designated at 12 is a fuel tank as an oil tank adjacent to the operating oil tank 11 and provided on the right side of the revolving frame 5. The fuel tank 12 is formed as a cuboid pressure-resistant tank surrounded by a front surface 12A, a rear surface (not shown), a left side surface 12B, a right side surface 12C, a top surface 12D, and a lower surface (not shown). The fuel tank 12 is used for storing sufficient fuel for a work for a prescribed time. The front surface 12A constituting the fuel tank 12 is configured as a rear wall of the equipment accommodating case 13 which will be described later. Moreover, on the top surface 12D, a fuel filling opening 12E for filling fuel is provided by projecting upward.

Subsequently, the equipment accommodating case 13 accommodating a control valve unit 20 which will be described later and the urea water tank 24 will be described.

Designated at 13 is the equipment accommodating case located on the front sides of the operating oil tank 11 and the fuel tank 12 and provided on the right front side of the revolving frame 5. This equipment accommodating case 13 is composed of the front surface 11A of the operating oil tank 11, the front surface 12A of the fuel tank 12, an inner side plate 14, an outer side plate 15, and an upper closing plate 16 which will be described later. The equipment accommodating case 13 has its inside defined as an accommodating space 13A, and in the equipment accommodating case 13, the control valve unit 20, the urea water tank 24, and required tools (not shown), which will be described later, are accommodated.

The inner side plate 14 is to constitute an inner side surface of the equipment accommodating case 13, and this inner side plate 14 is arranged close to the working mechanism 4 so as to be faced with an inner side position in the left-right direction of the upper revolving structure 3, that is, so as to be in parallel with the right vertical plate 5C. The inner side plate 14 is installed upright from the bottom plate 5A of the revolving frame 5, is faced with the right vertical plate 5C at a slight interval, and extends toward the front end of the revolving frame 5 from the front surface 11A of the operating oil tank 11 in a state where the same surface as the left side surface 11B of the operating oil tank 11 is formed. In this case, the inner side plate 14 is inclined (curved) downward to the front toward the front end of the revolving frame 5 from the operating oil tank 11.

The outer side plate 15 is to constitute an outer side surface of the equipment accommodating case 13, and the outer side plate 15 is constituted as an opening/closing cover (hereinafter the outer side plate 15 will be described as an opening/closing cover 15). This opening/closing cover 15 closes the accommodating space 13A of the equipment accommodating case 13 by its inner surface 15A, capable of opening/closing. The opening/closing cover 15 is disposed on the outside in the left-right direction of the upper revolving structure 3 which becomes the upper side of the right side frame 5E and is faced with the inner side plate 14 so as to sandwich the control valve unit 20, the urea water tank 24 and the like. As illustrated in FIG. 4, the opening/closing cover 15 is formed having a generally projecting curved shape and in a state formed on the same surface as the right side surface 12C of the fuel tank 12, extends from the front surface 12A of the fuel tank 12 toward the front end of the revolving frame 5. In this case, the opening/closing cover 15 is also inclined (curved) downward to the front toward the front end of the revolving frame 5 from the fuel tank 12 similarly to the inner side plate 14.

Here, the rear end side of the opening/closing cover 15 is supported by the revolving frame 5 through a hinge member 15B, while on the front end side of the opening/closing cover 15, a grip portion 15C (See FIG. 1) is provided. As a result, the opening/closing cover 15 is rotationally moved between an open position (a position in FIG. 4) for opening the accommodating space 13A of the equipment accommodating case 13 and a closed position (a position in FIG. 2) for closing the same around the hinge member 15B. Therefore, a worker can perform a maintenance work of the control valve unit 20 or supply water to the urea water tank 24, which will be described later, easily by gripping the grip portion 15C and rotationally moving the opening/closing cover 15 so as to open/close the accommodating space 13A.

Figure 3:
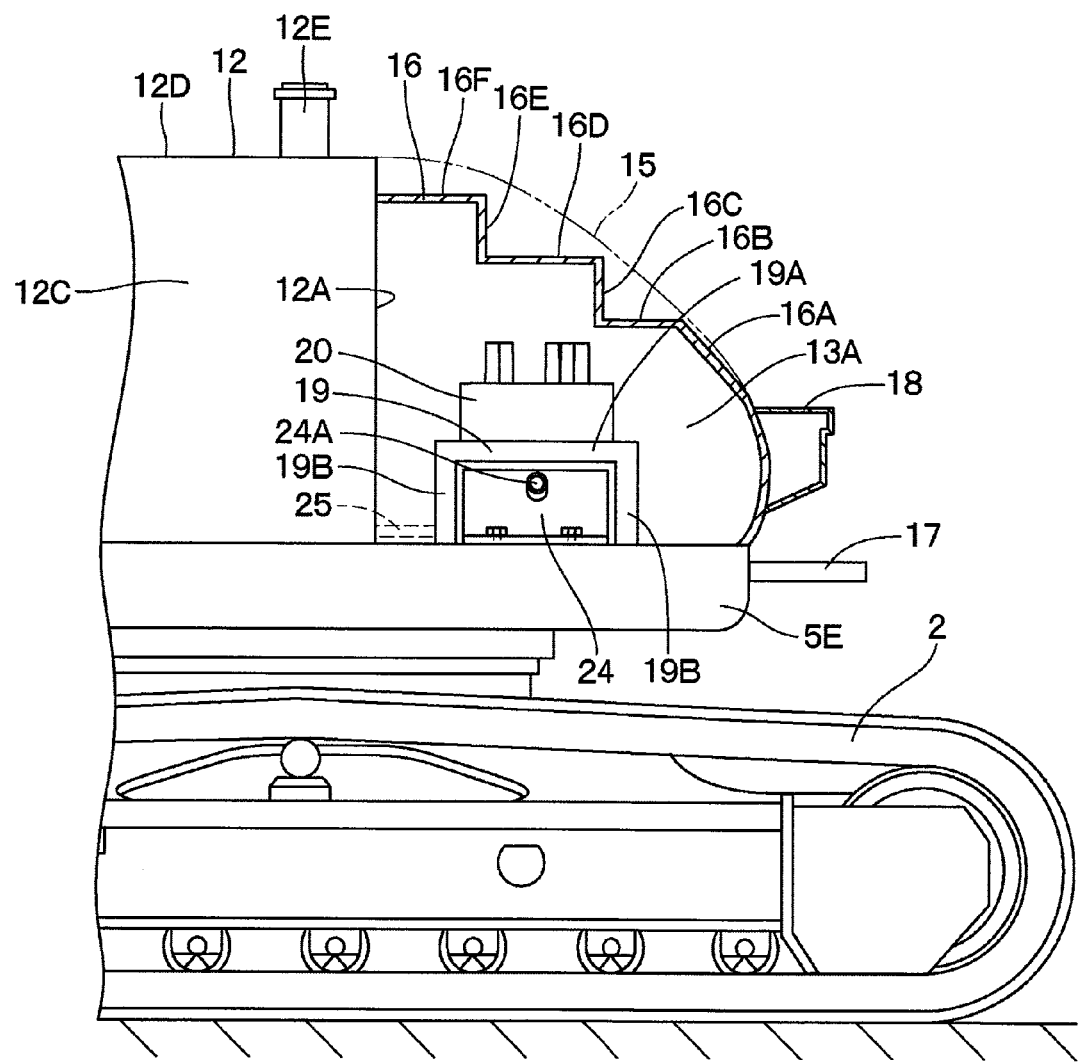
FIG. 3 is a broken front view of an essential part illustrating an accommodating space, a control valve unit, a urea water tank and the like according to the first embodiment in a state where an outer side plate is removed.

The upper closing plate 16 is to close the top surface and the front surface of the inner side plate 14 and the opening/closing cover 15. This upper closing plate 16 extends in the front-rear direction between the upper end portions of the front surface 11A of the operating oil tank 11 and the front surface 12A of the fuel tank 12 and the front end of the revolving frame 5 and closes the upper side of the inner side plate 14 and the upper side of the opening/closing cover 15. Here, as illustrated in FIG. 3, the upper closing plate 16 is composed of a front end plate 16A curved from the front end to the rear side of the revolving frame 5 and extending upward, a lower step plate 16B extending rearward from the upper end of the front end plate 16A in the horizontal direction, a vertical plate 16C extending upward from the rear end of the lower step plate 16B vertically, an intermediate step plate 16D extending rearward from the upper end of the vertical plate 16C in the horizontal direction, a vertical plate 16E extending upward from the rear end of the intermediate step plate 16D vertically, and a top step plate 16F extending in the horizontal direction toward the upper ends of the front surface 11A of the operating oil tank 11 and the front surface 12A of the fuel tank 12 located in the rear from the upper end of the vertical plate 16E.

A first-stage step plate 17 is provided by being located on the front side of the upper closing plate 16 and projecting forward from the front end of the revolving frame 5. A second-stage step plate 18 is provided by being located on an upper side of the step plate 17 and projecting forward from the front endplate 16A. As a result, by stepping on each of the step plates 17 and 18 and each of the step plates 16B, 16D, and 16F of the upper closing plate 16 in order from the lower traveling structure 2, an operator can easily get on the upper revolving structure 3 and can perform a filling work to the operating oil tank 11, the fuel tank 12 and the like easily and safely.

Designated at 19 is a bracket provided in the equipment accommodating case 13, and the bracket 19 is to support the control valve unit 20 which will be described later. Here, as illustrated in FIGS. 3 and 4, the bracket 19 is composed as a support base by a support plate 19A formed of a rectangular plate body extending in the horizontal direction and four leg portions 19B having distal ends extending downward from the four corners of the support plate 19A installed upright on the bottom plate 5A of the revolving frame 5. The control valve unit 20 is placed on this support plate 19A of the bracket 19. The number of the leg portions 19B supporting the support plate 19A is not limited to 4 but may be 3 or 5 or the support plate may be configured to be supported by using a leg portion obtained by folding a plate material in the inverted U-shape.

In this case, the leg portion 19B of the bracket 19 protrudes largely upward from the bottom plate 5A of the revolving frame 5, and the urea water tank 24 which will be described later can be arranged between the support plate 19A of the bracket 19 and the bottom plate 5A of the revolving frame 5.

Designated at 20 is the control valve unit arranged in the equipment accommodating case 13, and the control valve unit 20 is constituted as a collection of a large number of control valves, pilot valves and the like. This control valve unit 20 is accommodated in the equipment accommodating case 13 in a state mounted on the support plate 19A of the bracket 19.

The control valve unit 20 is to operate the vehicle body or the working mechanism 4 of the hydraulic excavator 1 by supplying/discharging the pressure oil supplied from the hydraulic pump 9 to/from every hydraulic actuator such as a driving motor, a revolving motor (not shown), each of hydraulic cylinders of the working mechanism 4 and the like in accordance with an operation of the operator.

Next, a configuration of the exhaust gas post-treatment device 21 provided with the NOx purifying device 23 and the like will be described by referring to FIG. 5 and the like.

Designated at 21 is the exhaust gas post-treatment device provided by being connected to the exhaust pipe 8A of the engine 8. This exhaust gas post-treatment device 21 is composed of a PM trapping device 22 for trapping and removing particulate matter (PM) in the exhaust gas and the NOx purifying device 23 which will be described later for purifying nitrogen oxides (NOx) contained in the exhaust gas by using urea water (urea aqueous solution) which is a reducing agent.

The PM trapping device (particulate matter removing device) 22 is provided by being connected to the outlet side of the exhaust pipe 8A of the engine 8. This PM trapping device 22 is to trap and remove particulate matter (PM) contained in the exhaust gas. The PM trapping device 22 is roughly composed of a cylindrical case 22A formed as a cylindrical container and a PM trapping filter 22B contained in the cylindrical case 22A. This PM trapping filter 22B is to trap particulate matter contained in the exhaust gas and to burn and remove the trapped particulate matter.

The NOx purifying device 23 is provided by being connected to the downstream side of the PM trapping device 22. This NOx purifying device 23 is to purify nitrogen oxides (NOx) in the exhaust gas by using urea water. The NOx purifying device 23 is composed of a cylindrical case 23A formed as a cylindrical container, an intermediate pipe 23B connecting the inlet side of the cylindrical case 23A to the outlet side of the PM trapping device 22, a tail pipe 23C extending upward from the outlet side of the cylindrical case 23A, a urea selective reduction catalyst 23D accommodated in the cylindrical case 23A, an oxidation catalyst 23E provided on the downstream side of the urea selective reduction catalyst 23D, and a urea water injection valve 23F provided on the intermediate pipe 23B which is the upstream side of the urea selective reduction catalyst 23D. The urea water injection valve 23F is connected to a urea water tank 24 through a urea water supply line 25 and a supply pump 26, which will be described later.

Here, in the NOx purifying device 23, a urea aqueous solution is injected into the exhaust gas by the urea water injection valve 23F, and NOx in the exhaust gas is subjected to reduction reaction by using ammonia generated from the urea aqueous solution by the urea selective reduction catalyst 23D and decomposed into water and nitrogen, while remaining ammonia remaining after reduction of NOx can be separated by oxidation by the oxidation catalyst 23E into water and nitrogen.

Subsequently, the urea water tank 24 according to the first embodiment provided in the equipment accommodating case 13 will be described by referring to FIGS. 3, 4 and the like.

Designated at 24 is the urea water tank provided by being connected to the NOx purifying device 23, and the urea water tank 24 is to store urea water to be injected to the intermediate pipe 23B from the urea water injection valve 23F. The urea water tank 24 is accommodated along with the control valve unit 20 in the accommodating space 13A in the equipment accommodating case 13 located on the front side of the operating oil tank 11, and the fuel tank 12. The urea water tank 24 is, as an exemplified example of its specific shape, formed as a flat box-shaped hollow container extending in the front-rear direction and the left-right direction. In the urea water tank 24, a water supply port 24A for supplying water is provided at a location on the side surface on the opening/closing cover 15 side. On the other hand, the urea water supply line 25 which will be described later is connected to the lower end portion of the urea water tank 24.

Here, the urea water tank 24 is arranged inside of the bracket 19 on which the control valve unit 20 is placed, that is, between the support plate 19A of the bracket 19 and the bottom plate 5A of the revolving frame 5. As described above, by ensuring a predetermined space on the lower part of the support plate 19A by increasing a height dimension of the leg portion 19B of the bracket 19, and by arranging the urea water tank 24 in the internal space, the control valve unit 20 and the urea water tank 24 can be accommodated efficiently by using the space in the vertical direction in the equipment accommodating case 13.

The urea water supply line 25 is provided by connecting the urea water tank 24 and the urea water injection valve 23F. The supply pump 26 is provided in this urea water supply line 25. As a result, the urea water in the urea water tank 24 is pressurized by the supply pump 26 and is injected into the intermediate pipe 23B from the urea water injection valve 23F.

The hydraulic excavator 1 according to the first embodiment has the configuration as above and subsequently, its operation will be described.

The operator gets on the cab 6, starts the engine 8 and drives the hydraulic pump 9. The operator can advance or retreat the lower traveling structure 2 by operating a lever for running and the like. On the other hand, the operator can perform an excavating work of earth and sand and the like by moving the working mechanism 4 upward/downward by operating a lever for working.

Here, during operation of the engine 8, nitrogen oxides (NOx) which is a hazardous substance is discharged from its exhaust pipe 8A. At this time, the urea water in the urea water tank 24 is supplied to the urea water injection valve 23F of the NOx purifying device 23 from the urea water supply line 25 by using the supply pump 26. The NOx purifying device 23 generates ammonia by injecting the urea water into the exhaust gas from the urea water injection valve 23F. The urea selective reduction catalyst 23D reduces the nitrogen oxides into water and nitrogen, while the oxidation catalyst 23E oxidizes the remaining ammonia remaining after reduction of NOx so as to separate it into water and nitrogen, whereby the emission amount of the nitrogen oxides (NOx) can be reduced.

In case the urea water is to be replenished into the urea water tank 24, the opening/closing cover 15 is moved to the open position illustrated in FIG. 4. As a result, a hand can easily reach the water supply port 24A of the urea water tank 24 arranged in the equipment accommodating case 13, and the urea water can be easily supplied into the urea water tank 24.

Thus, according to the first embodiment, by placing the control valve unit 20 on the support plate 19A of the bracket 19 provided in the equipment accommodating case 13 and by raising the height of the leg portion 19B of the bracket 19, the internal space is ensured between the bottom plate 5A of the revolving frame 5 and the support plate 19A, and the urea water tank 24 is arranged in the internal space.

As a result, the control valve unit 20 and the urea water tank 24 can be efficiently arranged in the space on the small upper revolving structure 3 of the rear small-revolving type hydraulic excavator 1 by effectively using the space in the vertical direction in the accommodating space 13A defined in the equipment accommodating case 13. Therefore, it is no longer necessary to arrange the urea water tank in the toolbox as in the conventional art, and the space of the toolbox can be ensured large. On the other hand, the urea water tank 24 can be mounted on a model not provided with a toolbox, and post treatment of the exhaust gas can be executed even in the small-sized hydraulic excavator 1.

The upper closing plate 16 constituting the equipment accommodating case 13 is configured such that a plurality of steps for climbing onto the operating oil tank 11 and the fuel tank 12 from the front end of the revolving frame 5, that is, the lower step plate 16B, the intermediate step plate 16D, and the top step plate 16F are provided. As a result, by placing a foot on each of the step plates 16B, 16D, and 16F provided on the upper closing plate 16 from the lower traveling structure 2, the operator can easily get on the upper revolving structure 3 and perform a filling work to the operating oil tank 11 and the fuel tank 12 and the like easily and safely.

Figure 6:
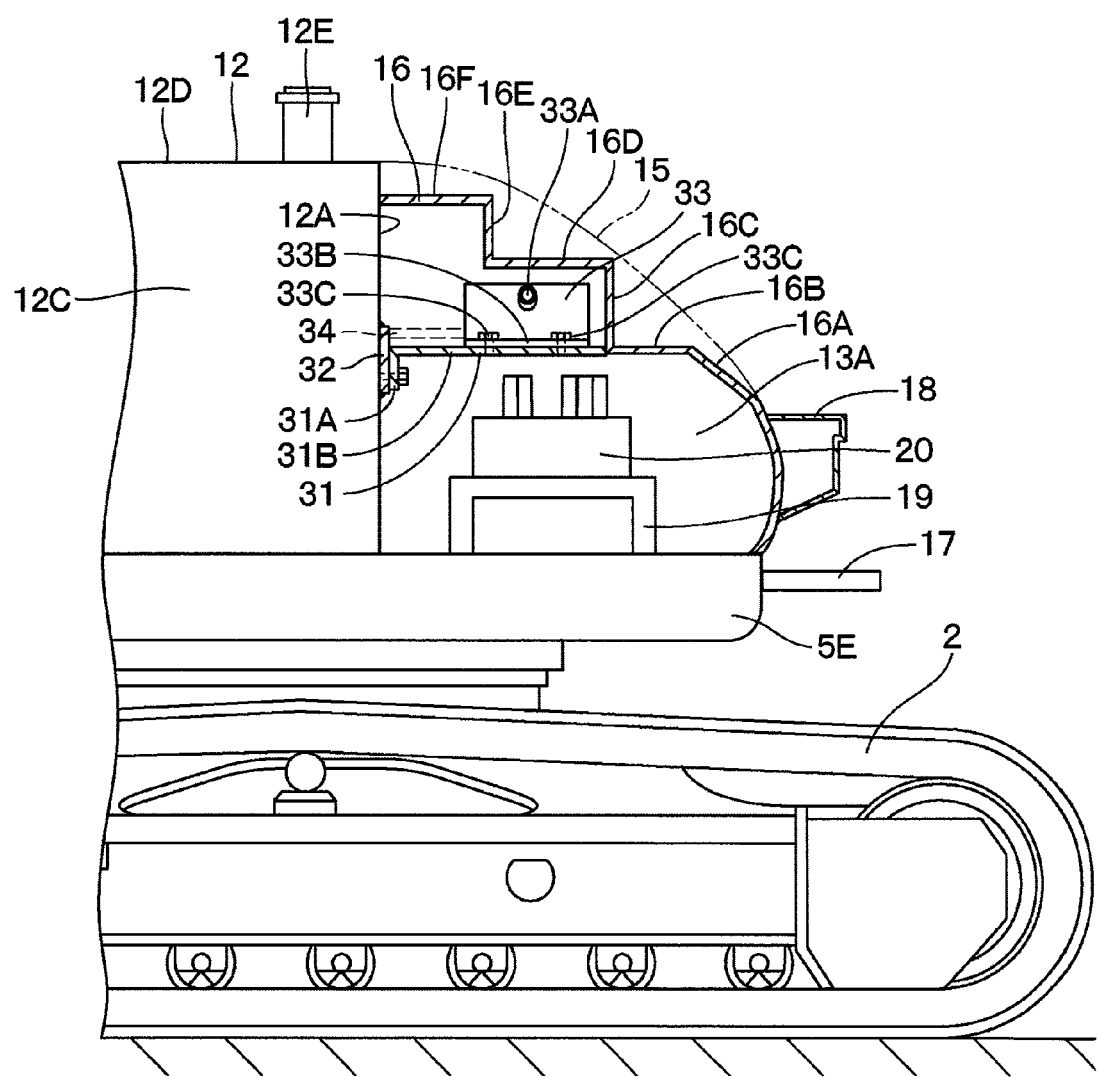
FIG. 6 is a broken front view of an essential part illustrating the accommodating space, the control valve unit, the urea water tank and the like according to a second embodiment in a state where an outer side plate is removed.
Figure 7:
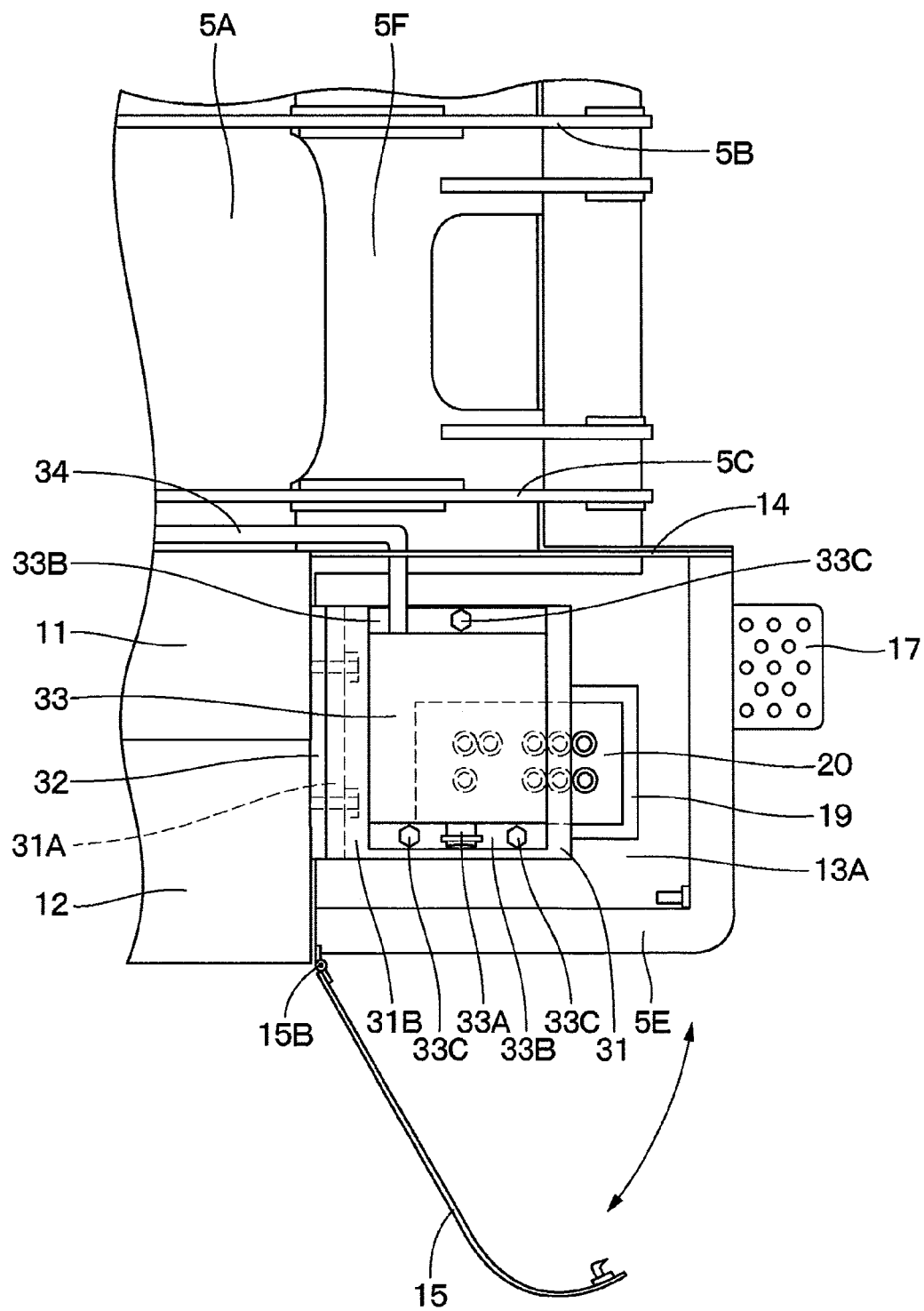
FIG. 7 is an enlarged plan view of an essential part illustrating the accommodating space, the control valve unit, the urea water tank and the like according to the second embodiment in a state where the upper closing plate is removed.

Next, FIGS. 6 and 7 illustrate a second embodiment of the present invention. A feature of the second embodiment is that in the accommodating space in the equipment accommodating case, a tank support member is provided by being located on the upper side of the control valve unit, and the urea water tank is arranged on the tank support member by being located on the back surface side of the upper closing plate. In the second embodiment, component elements that are identical to those in the foregoing first embodiment will be simply denoted by the same reference numerals to avoid repetitions of similar explanations.

Designated at 31 is a tank support member used in the second embodiment, and the tank support member 31 extends substantially horizontally from the front surface 11A of the operating oil tank 11 and the front surface 12A of the fuel tank 12 toward the lower step plate 16B of the upper closing plate 16. This tank support member 31 is formed having an L-shape made of a mounting portion 31A extending in the vertical direction and a support portion 31B extending in the horizontal direction. The tank support member 31 has its mounting portion 31A fixed by a bolt to a thick flat plate-shaped mounting plate 32 provided on the front surface 11A of the operating oil tank 11 and the front surface 12A of the fuel tank 12.

As a result, the support portion 31B of the tank support member 31 extends to the lower side of the intermediate step plate 16D constituting the upper closing plate 16, and a space in which a urea water tank 33 which will be described later is to be arranged is formed between the support portion 31B and the intermediate step plate 16D.

Designated at 33 is the urea water tank according to the second embodiment, used instead of the urea water tank 24 according to the first embodiment. This urea water tank 33 is formed as a flat box-shaped hollow container extending in the front-rear direction and the left-right direction substantially similarly to the urea water tank 24 according to the first embodiment, and a water supply port 33A for supplying water is provided on the outer side surface of the opening/closing cover 15 side. A flat plate-shaped mounting flange 33B is provided on the lower surface of the urea water tank 33. On the other hand, a urea water supply line 34 connecting the urea water tank 33 and the urea water injection valve 23F illustrated in FIG. 3 is connected to the lower end portion of the urea water tank 33.

The urea water tank 33 is arranged on the back surface side of the intermediate step plate 16D of the upper closing plate 16 formed in a stepped state by fixing the mounting flange 33B to the support portion 31B by a bolt 33C in a state placed on the support portion 31B of the tank support member 31.

As described above, in the second embodiment, the urea water tank 33 is configured to be arranged in a predetermined space formed between the tank support member 31 provided on the front surface sides of the operating oil tank 11 and the fuel tank 12 and the back surface of the intermediate step plate 16D formed on the upper closing plate 16 covering the equipment accommodating case 13. In other words, a recessed space formed on the back surface side of the stepped-state upper closing plate 16 is used as a place in which the urea water tank 33 is arranged.

As a result, in the second embodiment, the urea water tank 33 is efficiently arranged above the control valve unit 20 by using a stepped projecting and recessed shape of the back surface side of the upper closing plate 16 covering the equipment accommodating case 13. Therefore, the control valve unit 20 and the urea water tank 33 can be efficiently arranged in the space on the small upper revolving structure 3 of the rear small-revolving type hydraulic excavator 1 by effectively using the space in the vertical direction in the equipment accommodating case 13.

In the second embodiment, the tank support member 31 is configured to be fixed to the mounting plate 32 fastened to the front surfaces 11A and 12A of the operating oil tank 11 and the fuel tank 12, but the tank support member 31 may be configured to be fastened to the inner side plate 14, the upper closing plate 16 and the like of the equipment accommodating case 13, for example.

In the second embodiment, the case in which the water supply port 33A of the urea water tank 33 is provided on the side surface on the opening/closing cover 15 is exemplified, but the water supply port 33A may be configured to be provided on the front surface or the top surface of the urea water tank 33, for example.

Figure 8:
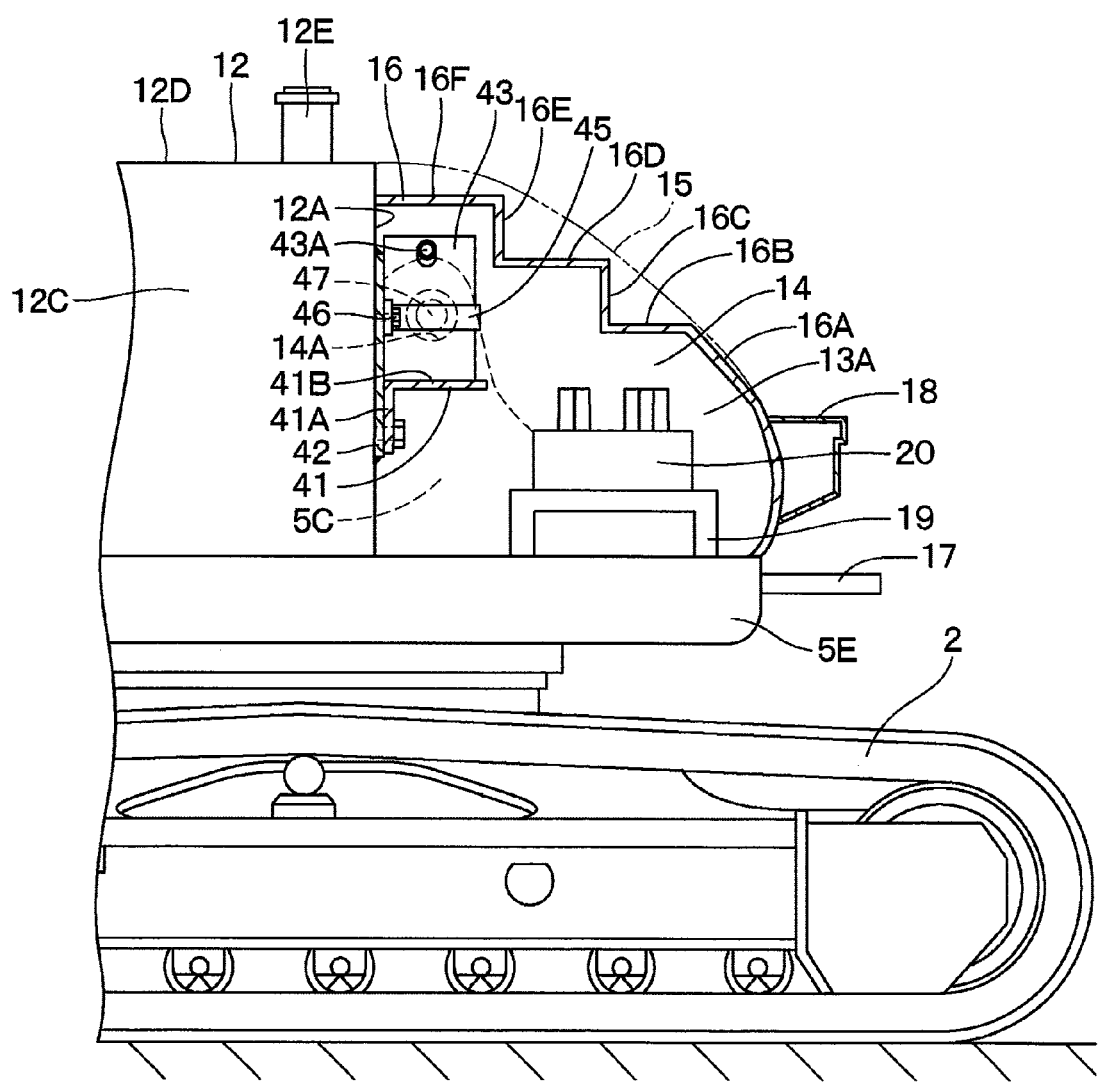
FIG. 8 is a broken front view of an essential part illustrating the accommodating space, the control valve unit, the urea water tank and the like according to a third embodiment in a state where the upper closing plate is removed.
Figure 9:
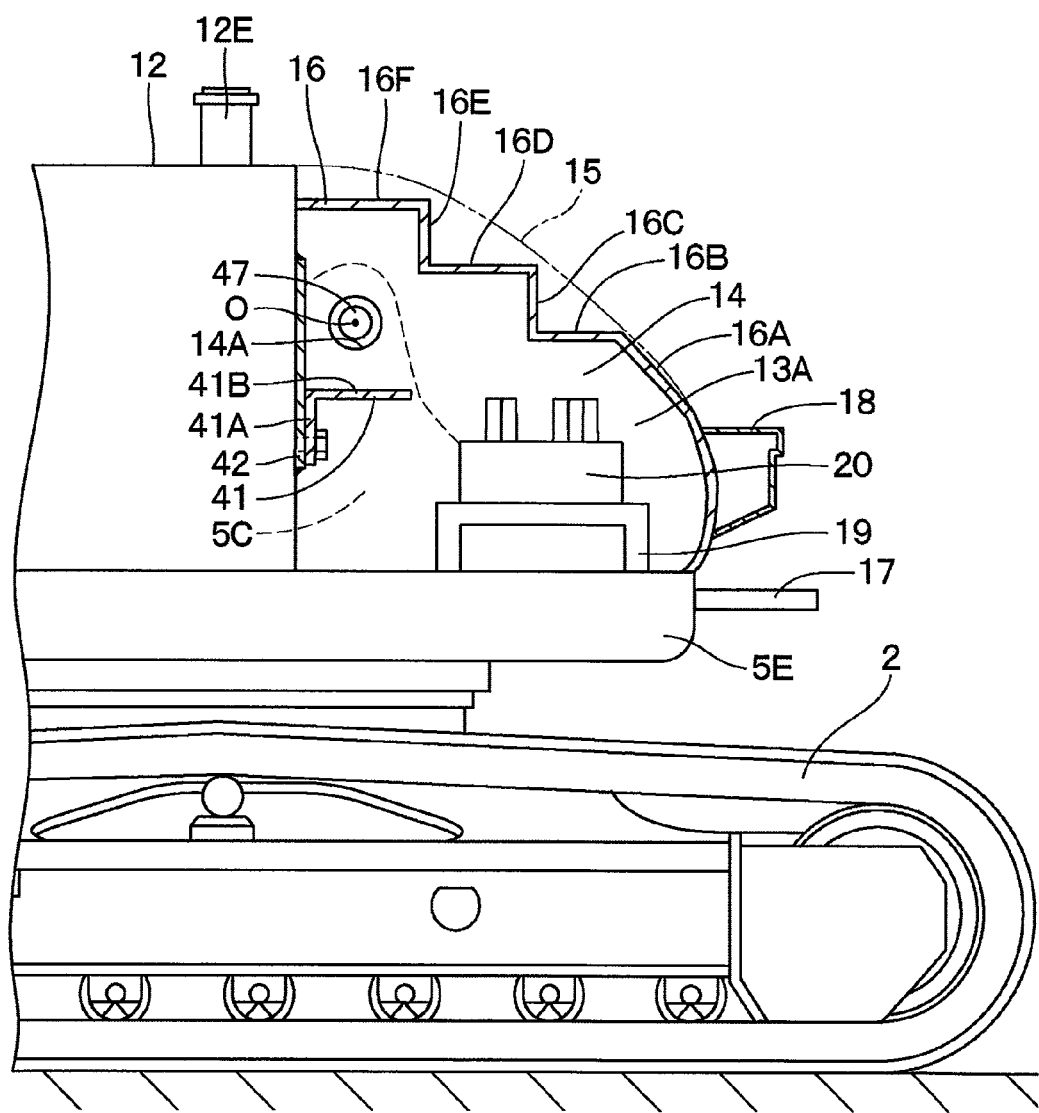
FIG. 9 is a broken front view of an essential part similar to FIG. 8 illustrating a state where a urea water tank is removed.
Figure 10:
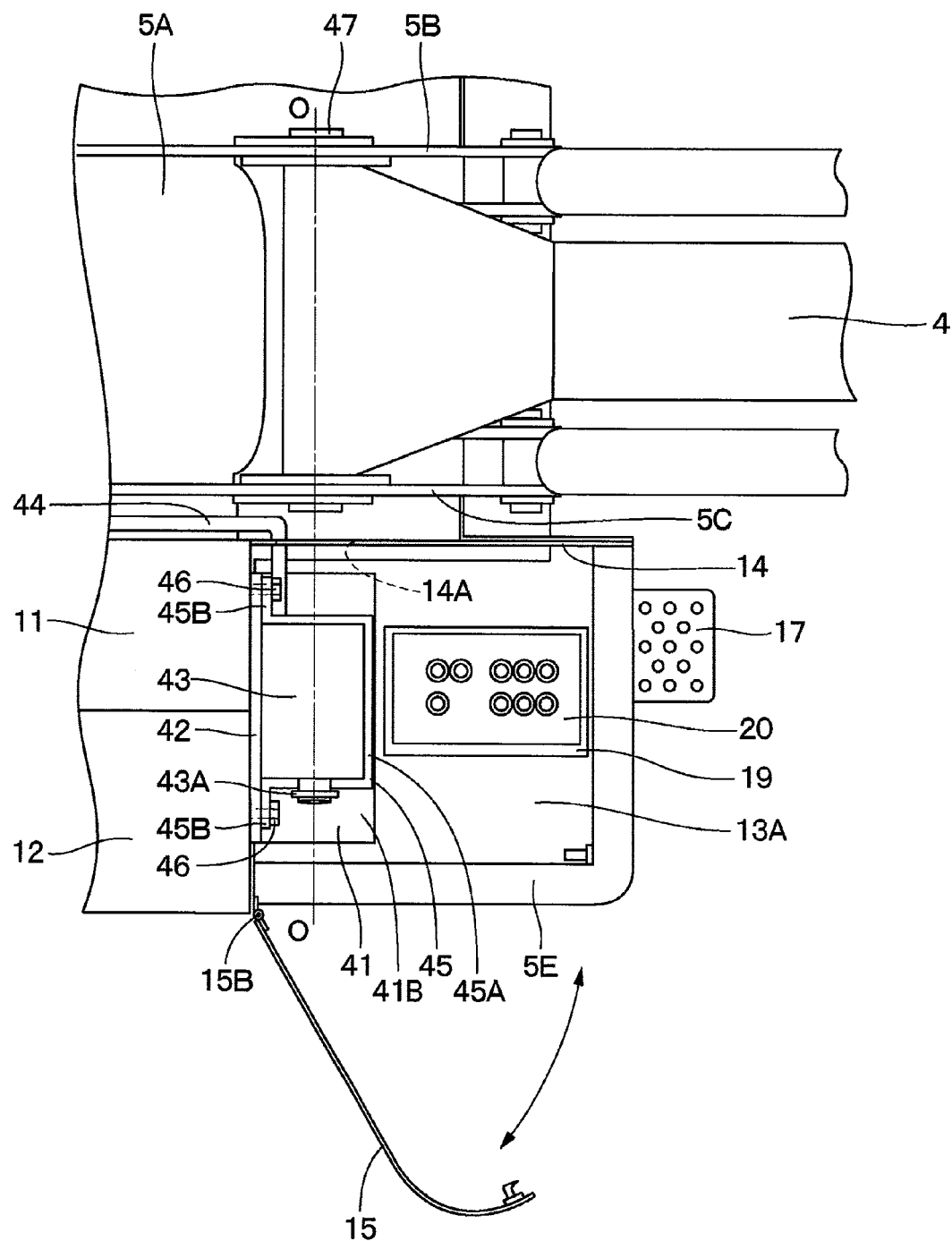
FIG. 10 is an enlarged plan view of an essential part illustrating the accommodating space, the control valve unit, the urea water tank and the like according to the third embodiment in a state where the upper closing plate is removed.

Next, FIGS. 8 to 10 illustrate a third embodiment of the present invention. A feature of the third embodiment is that the urea water tank is detachably arranged within a range of a pin movement trajectory indicating a moving direction of a connecting pin connecting the revolving frame and the working mechanism in the equipment accommodating case. In the third embodiment, component elements that are identical to those in the foregoing first embodiment will be simply denoted by the same reference numerals to avoid repetitions of similar explanations.

Designated at 41 is a tank support member extending substantially horizontally from the front surface 11A of the operating oil tank 11 and the front surface 12A of the fuel tank 12 toward the upper part of the control valve unit 20. This tank support member 41 is formed having an L-shape made of a mounting portion 41A extending in the vertical direction and a support portion 41B extending in the horizontal direction. The tank support member 41 has its mounting portion 41A fixed to a thick flat plate-shaped mounting plate 42 provided on the front surface 11A of the operating oil tank 11 and the front surface 12A of the fuel tank 12 by a bolt. Therefore, a space in which a urea water tank 43 which will be described later is to be arranged is formed between the support portion 41B of the tank support member 41 and the top step plate 16F constituting the upper closing plate 16.

Designated at 43 is the urea water tank according to the third embodiment, used instead of the urea water tank 24 according to the first embodiment. This urea water tank 43 is formed as a box-shaped hollow container extending in the vertical direction and the left-right direction, and a water supply port 43A for supplying water is provided on the side surface of the opening/closing cover 15 side. On the other hand, a urea water supply line 44 connecting the urea water tank 43 and the urea water injection valve 23F is connected to the lower end portion of the urea water tank 43.

A fixing member 45 is to detachably mount the urea water tank 43 into the equipment accommodating case 13. As illustrated in FIG. 10, this fixing member 45 is composed of a band portion 45A formed by folding a thin band-shaped flat plate in the U-shape in order to be fitted with the left and right side surfaces and the front surface of the urea water tank 43 and a mounting portion 45B provided on the both end portions of the band portion 45A and faced with the mounting plate 42 on each of the tanks 11 and 12 sides. The fixing member 45 fits the band portion 45A with the left and right side surfaces and the front surface of the urea water tank 43 in a state where the urea water tank 43 is placed on the support portion 41B of the tank support member 41 and mounts each of the mounting portions 45B on the mounting plate 42 by using a bolt 46. Therefore, the urea water tank 43 can be arranged above the control valve unit 20.

Here, as illustrated in FIGS. 8 and 9, on the inner side plate 14 constituting the equipment accommodating case 13, a connecting pin moving hole 14A allowing movement of a connecting pin 47 rotatably connecting the working mechanism 4 and the left vertical plate 5B and the right vertical plate 5C of the revolving frame 5 in the left-right direction during an attaching/detaching work is provided. Therefore, a worker can perform a connecting work or a removing work of the working mechanism 4 and the revolving frame 5 by opening the opening/closing cover 15 and inserting/removing the connecting pin 47 through the connecting pin moving hole 14A. As illustrated in FIG. 10, the moving direction of the connecting pin 47 at this time can be illustrated as a pin moving trajectory O-O.

In the third embodiment, the urea water tank 43 is arranged within a range of the pin moving trajectory O-O which is the moving direction of the connecting pin 47, and the urea water tank 43 is configured to be detachably mounted on the support portion 41B of the tank support member 41 by using the fixing member 45.

Therefore, as illustrated in FIG. 9, when an inserting/removing work of the connecting pin 47 with respect to the left vertical plate 5B and the right vertical plate 5C of the revolving frame 5 and the working mechanism 4 is performed, a space for inserting/removing the connecting pin 47 can be ensured by removing the fixing member 45 from the mounting plate 42 and removing the urea water tank 43 from the range of the pin moving trajectory O-O which is the moving direction of the connecting pin 47, and the inserting/removing work can be performed smoothly.

As described above, in the third embodiment, the urea water tank 43 is configured to be detachably arranged in a space within the range of the pin moving trajectory O-O which is the moving direction of the connecting pin 47 connecting the left vertical plate 5B and the right vertical plate 5C of the revolving frame 5 to the working mechanism 4. Therefore, the control valve unit 20 can be arranged by avoiding the pin moving trajectory O-O and can be arranged at a position not obstructing the work of inserting/removing the connecting pin 47. Moreover, by using a space that could not be used for inserting/removing the connecting pin 47 as an installation location for the urea water tank 43, the control valve unit 20 and the urea water tank 43 can be arranged by effectively using the entire accommodating space 13A.

Figure 11:
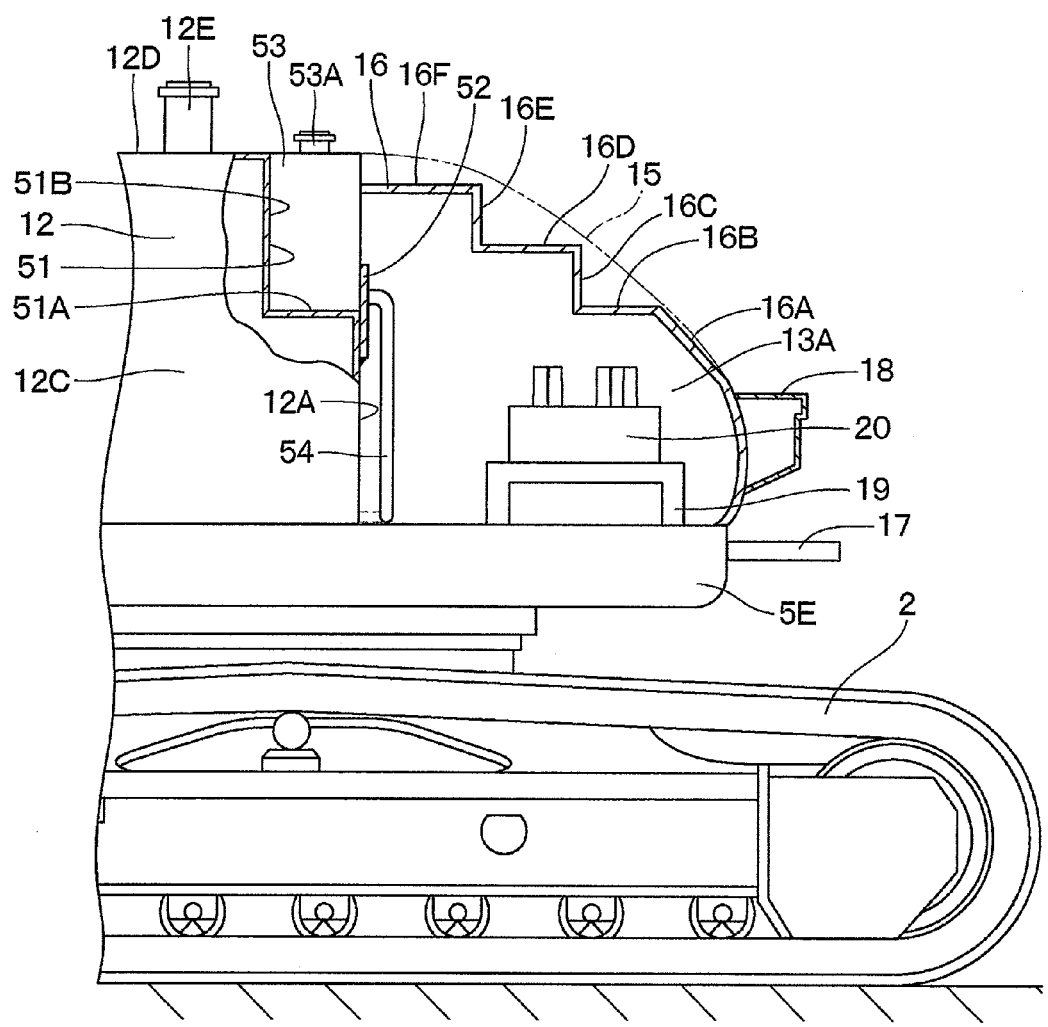
FIG. 11 is a broken front view of an essential part illustrating the accommodating space, the control valve unit, the urea water tank and the like according to a fourth embodiment in a state where the outer side plate is removed.
Figure 12:
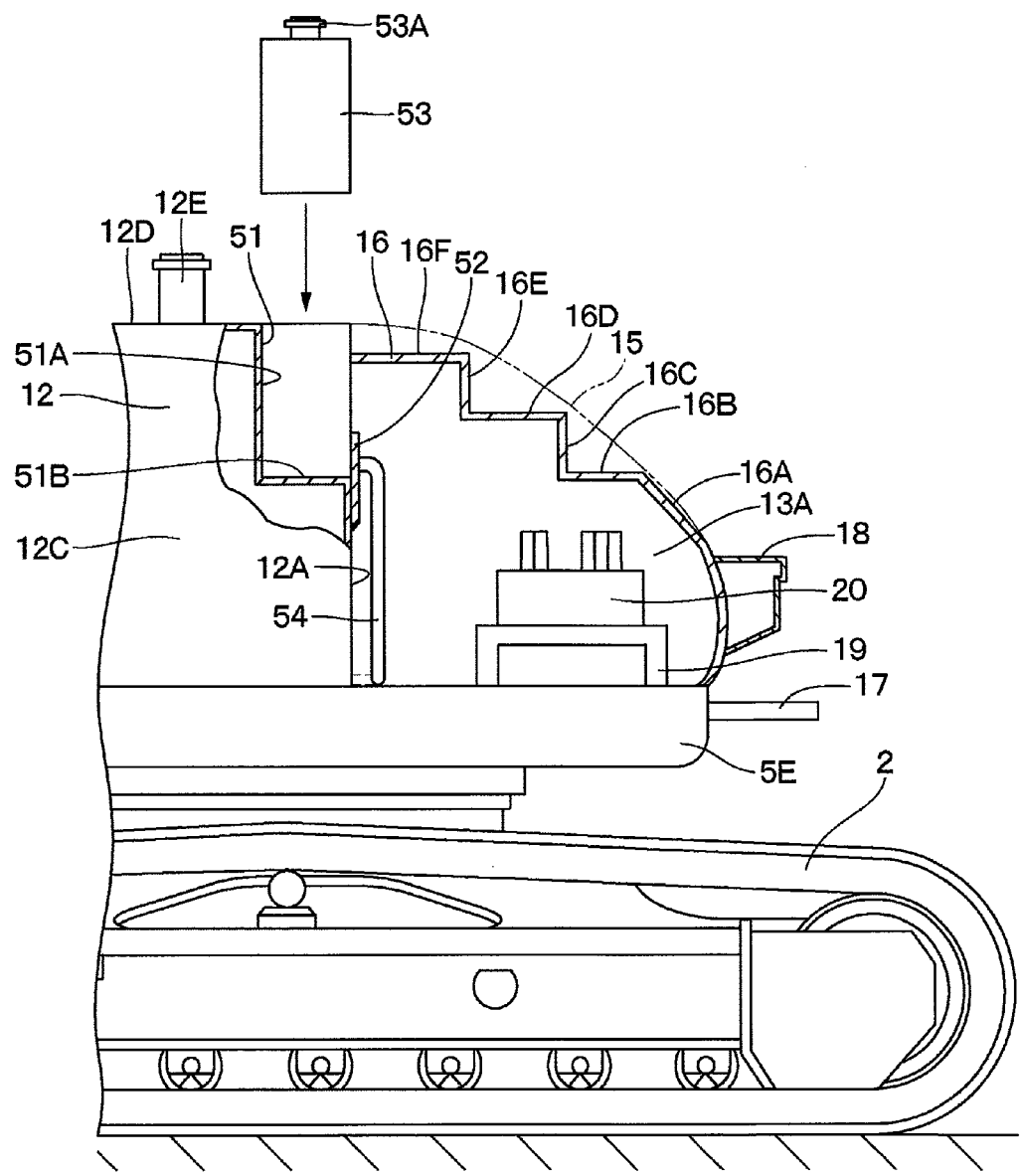
FIG. 12 is a broken front view of an essential part similar to FIG. 11 illustrating a state where the urea water tank is removed.
Figure 13:
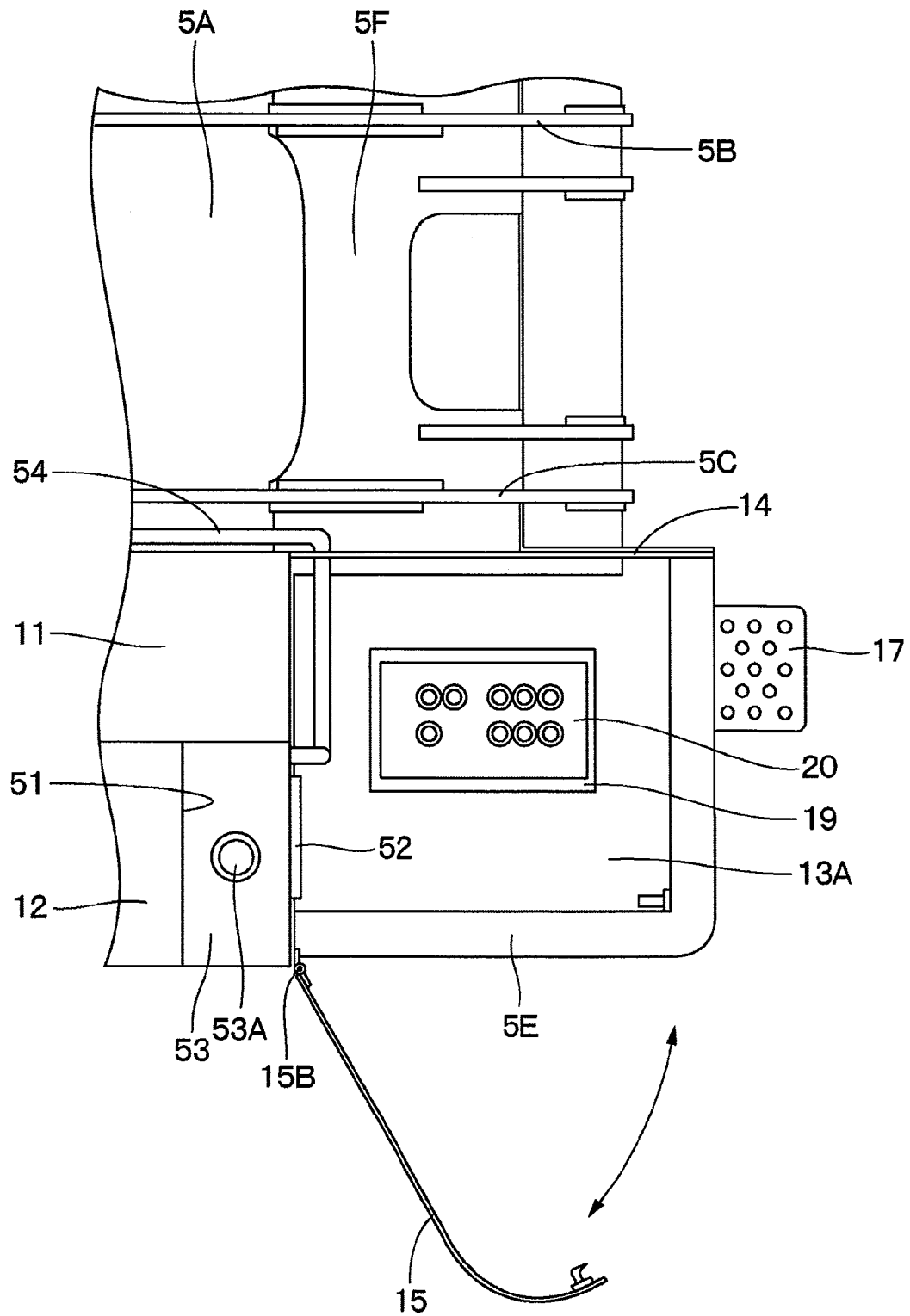
FIG. 13 is an enlarged plan view of an essential part illustrating the accommodating space, the control valve unit, the urea water tank and the like according to the fourth embodiment in a state where the upper closing plate is removed.

Next, FIGS. 11 to 13 illustrate a fourth embodiment of the present invention. A feature of the fourth embodiment is that a notched portion forming a part of the accommodating space by denting a part of the front surface of the oil tank rearward is provided thereon, and the urea water tank is arranged in the notched portion of the oil tank. In the fourth embodiment, component elements that are identical to those in the foregoing first embodiment will be simply denoted by the same reference numerals to avoid repetitions of similar explanations.

Designated at 51 is a notched portion provided in the fuel tank 12. As illustrated in FIGS. 12 and 13, the notched portion 51 is formed as a recessed portion corresponding to the outer shape of a urea water tank 53 which will be described later by notching the upper end portion of the front surface 12A of the fuel tank 12 so as to be dented rearward. This notched portion 51 is opened on the rear side of the accommodating space 13A and forms a part of the accommodating space 13A.

By providing the notched portion 51 on the front surface 12A of the fuel tank 12, a bottom surface 51A and a rear surface 51B of the notched portion 51 are formed on the upper end side of the front surface 12A of the fuel tank 12, and this notched portion 51 constitutes a part of the accommodating space 13A. Moreover, a flat plate-shaped fixing plate 52 is fastened to the front surface 12A of the fuel tank 12 by welding. This fixing plate 52 is to fix the urea water tank 53 to the notched portion 51 by projecting upward from the bottom surface 51A of the notched portion 51.

Designated at 53 is the urea water tank according to the fourth embodiment used instead of the urea water tank 24 according to the first embodiment. This urea water tank 53 is formed as a box-shaped hollow container extending in the vertical direction and the left-right direction, and a water supply port 53A for supplying water is provided on the top surface thereof. A urea water supply line 54 connecting the urea water tank 53 and the urea water injection valve 23F is connected to the lower end portion of the urea water tank 53.

As illustrated in FIG. 11, the urea water tank 53 can be arranged in the notched portion 51 forming a part of the accommodating space 13A by being placed on the bottom surface 51A of the notched portion 51 provided on the front surface 12A of the fuel tank 12 so as to be brought into contact with the fixing plate 52. In this case, since the notched portion 51 is made to correspond to the outer shape of the urea water tank 53, is the top surface of the urea water tank 53 is made the same surface as the top surface of the fuel tank 12, and the fuel filling opening 12E of the fuel tank 12 and the water supply port 53A of the urea water tank 53 can be arranged adjacently in the front-rear direction.

As described above, according to the fourth embodiment, by providing the notched portion 51 on the front surface 12A of the fuel tank 12 forming a rear wall of the equipment accommodating case 13, the accommodating space 13A in the equipment accommodating case 13 can be enlarged. Therefore, by using the space enlarged by the notched portion 51, the control valve unit 20 and the urea water tank 53 can be arranged with allowance in the equipment accommodating case 13, and a maintenance work of them and the like can be preformed efficiently.

In the fourth embodiment, the notched portion 51 is formed only on the front surface 12A of the fuel tank 12, but the notched portion may be provided only on the front surface 11A of the operating oil tank 11, for example, or may be configured to be provided on both of the front surface 11A of the operating oil tank 11 and the front surface 12A of the fuel tank 12.

Figure 14:
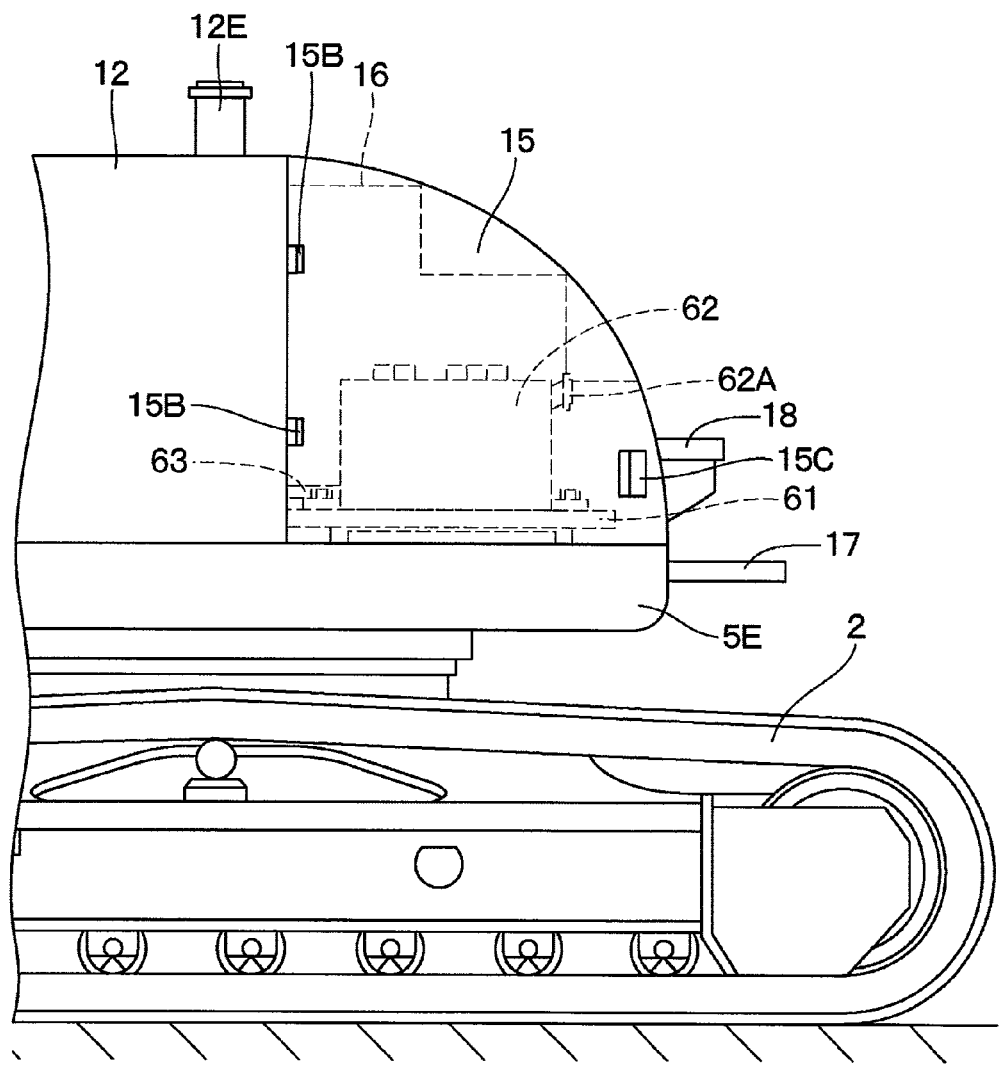
FIG. 14 is an enlarged front view of an essential part illustrating the accommodating space, the control valve unit, the urea water tank and the like according to a fifth embodiment.
Figure 15:
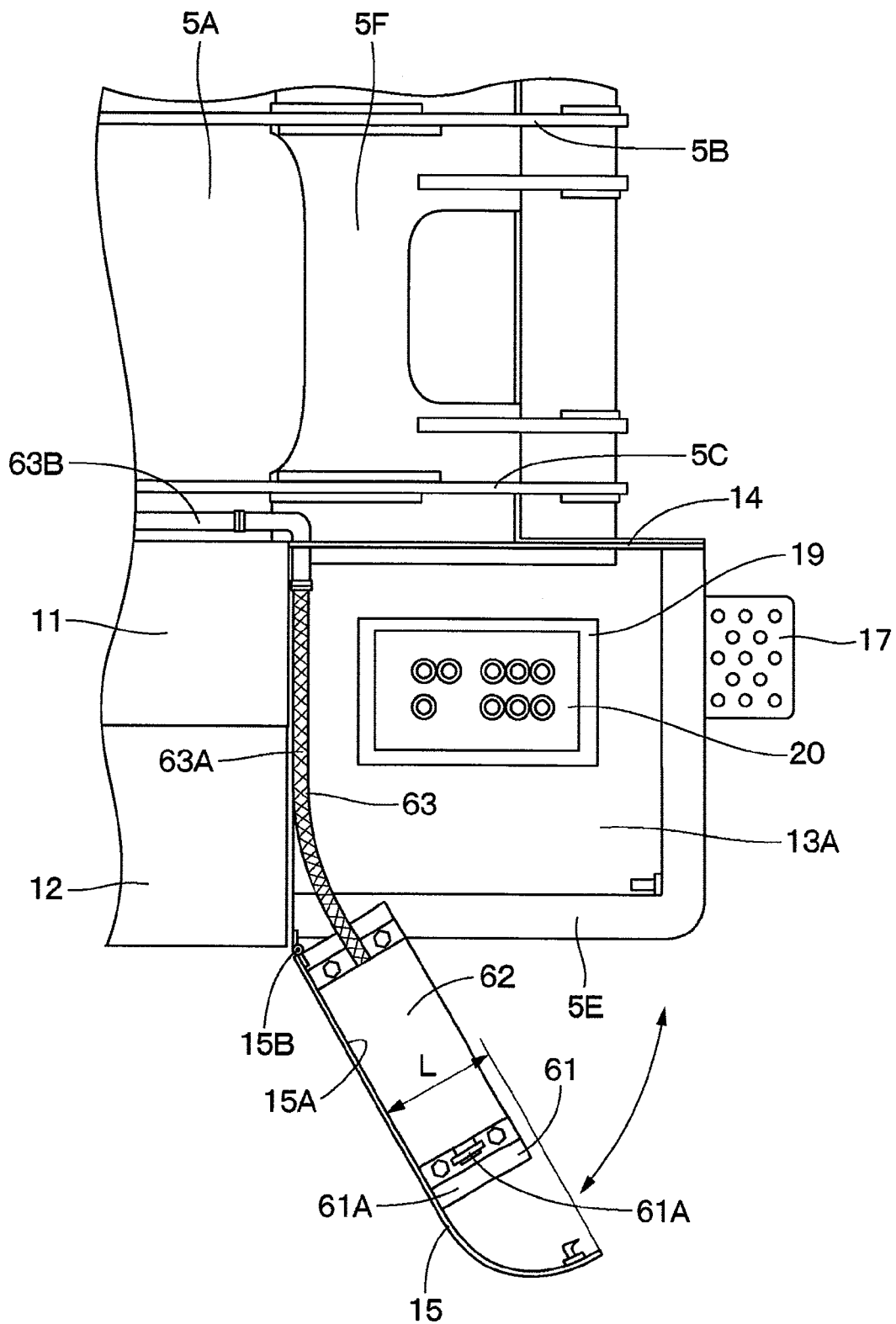
FIG. 15 is an enlarged plan view of an essential part illustrating the accommodating space, the control valve unit, the urea water tank and the like according to the fifth embodiment in a state where the upper closing plate is removed.

Next, FIGS. 14 and 15 illustrate a fifth embodiment of the present invention. A feature of the fifth embodiment is that the urea water tank is arranged on the inner surface of the opening/closing cover. In the fifth embodiment, component elements that are identical to those in the foregoing first embodiment will be simply denoted by the same reference numerals to avoid repetitions of similar explanations.

Designated at 61 is a tank support member provided on the inner surface 15A of the opening/closing cover 15, and the tank support member 61 is to support a urea water tank 62 which will be described later. This tank support member 61 is made of a rectangular flat plate and is fastened to the inner surface 15A of the opening/closing cover 15 by fastening means such as welding or the like. As a result, when the opening/closing cover 15 is set to the closed position, the tank support member 61 horizontally extends from the inner surface 15A of the opening/closing cover 15 toward the accommodating space 13A in the equipment accommodating case 13. The tank support member 61 can arrange the urea water tank 62 in the accommodating space 13A at the closed position of the opening/closing cover 15 by fixing the urea water tank 62 to an upper surface 61A thereof.

Designated at 62 is the urea water tank according to the fifth embodiment used instead of the urea water tank 24 according to the first embodiment. This urea water tank 62 is formed as a box-shaped hollow container extending in the vertical direction and the front-rear direction, and a water supply port 62A for supplying water is provided on the front surface thereof. A urea water supply line 63 connecting the urea water tank 62 and the urea water injection valve 23F is connected to the lower end portion of the urea water tank 62.

The urea water tank 62 is mounted on the inner surface 15A of the opening/closing cover 15 through the tank support member 61. Here, the urea water tank 62 according to the fifth embodiment moves together with the opening/closing cover 15 when it is opened/closed. Therefore, the urea water supply line 63 connects a pipe 63B and the urea water tank 62 by a pressure-resistant hose 63A capable of expansion/contraction. Supposing that a width dimension in the left-right direction of the opening/closing cover 15 is a dimension L, the urea water tank 62 is set having a size that can be contained in this width dimension L.

As described above, according to the fifth embodiment, when the opening/closing cover 15 is set at the closed position, the control valve unit and the urea water tank 62 can be accommodated in the equipment accommodating case 13. On the other hand, as illustrated in FIG. 15, when the opening/ closing cover 15 is set at the open position, the urea water tank 62 can be moved to the outside of the equipment accommodating case 13. Therefore, when a maintenance work for the control valve unit 20 is to be performed, a large work space can be ensured around this control valve unit 20 and workability of a maintenance work can be improved.

It should be noted that the urea aqueous solution stored in the urea water tank coagulates in the vicinity of −10° C. Thus, the urea water tank may be insulated and warmed by an insulating material in each of the embodiments.

Moreover, in each of the embodiments, a crawler-type hydraulic excavator 1 as a construction machine is explained as an example. However, the present invention is not limited to that and may be applied to a wheel-type hydraulic excavator. Moreover, the present invention can be widely applied to other construction machines such as a hydraulic crane and the like other than that.

DESCRIPTION OF REFERENCE NUMERALS

1: Hydraulic excavator (Construction machine)
2: Lower traveling structure
3: Upper revolving structure
4: Working mechanism
5: Revolving frame
8: Engine
8A: Exhaust pipe
9: Hydraulic pump
11: Operating oil tank (Oil tank)
11A, 12A: Front surface
12: Fuel tank (Oil tank)
13: Equipment accommodating case
13A: Accommodating space
14: Inner side plate
14A: Connecting pin moving hole
15: Opening/closing cover (Outer side plate)
15A: Inner surface
16: Upper closing plate
16A: Front end plate
16B: Lower step plate
16C, 16E: Vertical plate
16D: Intermediate step plate
16F: Top step plate
19: Bracket
19A: Support plate
19B: Leg portion
20: Control valve unit
21: Exhaust gas post-treatment device
22: PM trapping device
23: NOx purifying device
23D: Urea selective reduction catalyst
23E: Oxidation catalyst
23F: Urea water injection valve
24, 33, 43, 53, 62: Urea water tank
31, 41, 61: Tank support member
47: Connecting pin
51: Notched portion
O-O: Pin moving trajectory of connecting pin

The invention claimed is:

1. A construction machine comprising:
a lower traveling structure;
an upper revolving structure rotatably mounted on said lower traveling structure; and
a working mechanism tiltably provided on the front part of said upper revolving structure;
said upper revolving structure being provided with a revolving frame forming a support structural body,
an engine mounted on the rear side of said revolving frame and driving a hydraulic pump,
an oil tank arranged on a front side of said engine and on one side in a left-right direction of said revolving frame and storing fuel to be supplied to said engine or operating oil to be supplied to a hydraulic actuator,
an equipment accommodating case located on the front side of said oil tank and provided on said revolving frame so as to form an accommodating space inside,
a control valve unit including a collection of a large number of control valves in order to control supply/discharge of the operating oil between said hydraulic pump and said hydraulic actuator,
a NOx purifying device provided in the middle of an exhaust pipe of said engine and provided with a urea selective reduction catalyst removing nitrogen oxides contained in the exhaust gas,
a urea water injection valve located on the upstream side of said urea selective reduction catalyst in a flow direction of said exhaust gas and injecting urea water which is a reducing agent to said exhaust gas flowing through said exhaust pipe, and
a urea water tank connected to said urea water injection valve and formed of a hollow container for storing said urea water,
wherein:
said equipment accommodating case is composed of a front surface of said oil tank, an inner side plate extending forward from said oil tank in order to form an inner side surface in the left-right direction of said accommodating space, an outer side plate extending forward from said oil tank in order to form an outer side surface in the left-right direction of said accommodating space, and an upper closing plate located between said oil tank and a front end of said revolving frame and covering upper sides of said inner side plate and said outer side plate, and
in said accommodating space in said equipment accommodating case a bracket having a leg portion installed upright on said revolving frame and a support plate provided on the upper end side of said leg portion is provided, said control valve unit is mounted on said support plate of said bracket, and said urea water tank is arranged between said support plate of said bracket and said revolving frame.

2. The construction machine according to claim 1, wherein said upper closing plate is configured to have steps formed of a plurality of steps from a front end of said revolving frame toward said oil tank.

* * * * *